US012738759B2

(12) United States Patent
Zuo et al.

(10) Patent No.: US 12,738,759 B2
(45) Date of Patent: Sep. 15, 2026

(54) CHARGING AND HEATING APPARATUS AND METHOD AND APPARATUS FOR CONTROLLING SAME

(71) Applicant: CONTEMPORARY AMPEREX TECHNOLOGY (HONG KONG) LIMITED, Hong Kong (CN)

(72) Inventors: Xiyang Zuo, Ningde (CN); Yu Yan, Ningde (CN); Zhimin Dan, Ningde (CN); Zhanliang Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 794 days.

(21) Appl. No.: 18/186,948

(22) Filed: Mar. 21, 2023

(65) Prior Publication Data

US 2023/0299606 A1 Sep. 21, 2023

Related U.S. Application Data

(63) Continuation of application No. PCT/CN2021/139738, filed on Dec. 20, 2021.

(30) Foreign Application Priority Data

Jan. 20, 2021 (CN) ......................... 202110078716.3

(51) Int. Cl.
*H02J 7/00* (2026.01)
*B60L 58/12* (2019.01)
(Continued)

(52) U.S. Cl.
CPC ................ *H02J 7/96* (2026.01); *B60L 58/12* (2019.02); *B60L 58/16* (2019.02); *B60L 58/27* (2019.02);
(Continued)

(58) Field of Classification Search
CPC ........ H02J 7/96; H02J 7/40; H02J 7/82; H02J 7/977; H02J 2207/20; B60L 58/12;
(Continued)

(56) References Cited

U.S. PATENT DOCUMENTS

2014/0285135 A1 9/2014 Ji et al.
2020/0259360 A1 8/2020 Tagawa et al.

FOREIGN PATENT DOCUMENTS

CN 105680114 A 6/2016
CN 108621829 A * 10/2018 ............. H04L 67/55
(Continued)

OTHER PUBLICATIONS

The European Patent Office (EPO) The Extended European Search Report for Application No. 21920835.2 May 21, 2024 8 Pages.
(Continued)

*Primary Examiner* — Zixuan Zhou
(74) *Attorney, Agent, or Firm* — Anova Law Group, PLLC

(57) ABSTRACT

A charging and heating apparatus includes a power unit configured to be connected to a battery to be charged/discharged and perform voltage conversion on a received voltage and current and output a converted voltage to the battery, a unidirectional/bidirectional conversion unit connected to the power unit and configured to output a bidirectional alternating current or a preset current to the power unit, and a control unit connected to the unidirectional/bidirectional conversion unit and configured to, in response to the battery being in a heating mode, control the unidirectional/bidirectional conversion unit to output the bidirectional alternating current to the corresponding power unit, such that the battery self-heats under excitation of the bidirectional alternating current, and in response to the battery being in a charge/discharge mode, control the uni-
(Continued)

Obtain a state parameter of a battery read by a battery management system — S201

S202 — Output a first bidirectional alternating current to the battery under a condition that the state parameter is within a first preset range, such that the battery self-heats under driving of the first bidirectional alternating current Output a preset current to the battery under a condition that the state parameter is within a second preset range, such that the battery is charged — S203 directional/bidirectional conversion unit to output the preset current to the power unit, such that the battery is charged/discharged.

14 Claims, 3 Drawing Sheets

(51) Int. Cl.

| | |
|---|---|
| ***B60L 58/16*** | (2019.01) |
| ***B60L 58/27*** | (2019.01) |
| ***H01M 10/44*** | (2006.01) |
| ***H01M 10/48*** | (2006.01) |
| ***H01M 10/615*** | (2014.01) |
| ***H01M 10/657*** | (2014.01) |
| ***H02J 7/40*** | (2026.01) |
| ***H02J 7/82*** | (2026.01) |
| ***H02J 7/90*** | (2026.01) |
| ***H02J 7/96*** | (2026.01) |

(52) U.S. Cl.
CPC ....... *H01M 10/443* (2013.01); *H01M 10/488* (2013.01); *H01M 10/615* (2015.04); *H01M 10/657* (2015.04); *H02J 7/40* (2026.01); *H02J 7/82* (2026.01); *H02J 7/977* (2026.01); *H02J 2207/20* (2020.01)

(58) Field of Classification Search
CPC ...... B60L 58/16; B60L 58/27; H01M 10/443; H01M 10/488; H01M 10/615; H01M 10/657
USPC ............................................ 320/109; 701/22
See application file for complete search history.

(56) References Cited

FOREIGN PATENT DOCUMENTS

| | | | | | |
|---|---|---|---|---|---|
| CN | 109823234 | A | | 5/2019 | |
| CN | 109950659 | A | | 6/2019 | |
| CN | 109950660 | A | | 6/2019 | |
| CN | 110137628 | A | | 8/2019 | |
| CN | 110962631 | A | | 4/2020 | |
| CN | 111029667 | A | * | 4/2020 | ........ H02J 7/007194 |
| CN | 111048860 | A | | 4/2020 | |
| CN | 111357148 | A | | 6/2020 | |
| CN | 111762066 | A | | 10/2020 | |
| CN | 112186307 | A | | 1/2021 | |
| CN | 112216908 | A | | 1/2021 | |
| EP | 3490053 | A1 | | 5/2019 | |
| EP | 3758127 | A1 | | 12/2020 | |
| JP | 5293820 | B2 | | 9/2013 | |
| KR | 20130031204 | A | | 3/2013 | |
| KR | 20210023038 | A | | 3/2021 | |
| WO | 2011122946 | A2 | | 10/2011 | |

OTHER PUBLICATIONS

The World Intellectual Property Organization (WIPO) International Search Report and Written Opinion for PCT/CN2021/139738 Mar. 16, 2022 14 Pages (including translation).

China National Intellectual Property Administration (CNIPA) Notice of First Examination Opinion for Application 202110078716.3 Jun. 9, 2023 18 Pages (including translation).

China National Intellectual Property Administration (CNIPA) Second review opinion notice for Application 202110078716.3 Aug. 15, 2023 14 Pages (including translation).

China National Intellectual Property Administration (CNIPA) Notice of Grant of Invention Patent Right for Application No. 202110078716.3 Oct. 31, 2023 6 pages (including translation).

* cited by examiner

CHARGING AND HEATING APPARATUS AND METHOD AND APPARATUS FOR CONTROLLING SAME

CROSS-REFERENCE TO RELATED APPLICATIONS

The present application is a continuation of International Application No. PCT/CN2021/139738, filed on Dec. 20, 2021, which claims priority to Chinese Patent Application No. 202110078716.3, entitled "CHARGING AND HEATING APPARATUS AND METHOD AND APPARATUS FOR CONTROLLING SAME", and filed on Jan. 20, 2021, the entire contents of both of which are incorporated herein by reference.

TECHNICAL FIELD

The present application relates to the field of battery charging technologies, and specifically to a charging and heating apparatus and a method and apparatus for controlling the charging and heating apparatus.

BACKGROUND ART

For vehicle usage, with the continuous promotion of electric vehicles, there is an increasing number of charging piles. However, it takes a relatively long time to fully charge a battery using a charging pile. Therefore, how to improve charging efficiency is an urgent technical problem to be solved in the field of charging technologies.

The charging efficiency of a battery during charging is positively correlated with a temperature within a specific range. In order to improve the charging efficiency, a heating structure is generally provided on the battery to heat the battery to improve the charging efficiency. However, heating the battery by using the provided heating structure may increase weight of the battery and reduce a ratio of stored power to the mass of the battery. In addition, such a method of heating by using the provided heating structure has relatively low heating efficiency, which is detrimental to improving the charging efficiency.

SUMMARY

An objective of embodiments of the present application is to provide a charging and heating apparatus and a method and apparatus for controlling a charging and heating apparatus, so that there may be no need for a dedicated heating structure to heat a battery, energy stored by a battery of the same mass may be increased, and heating efficiency, and further, charging efficiency may be improved.

According to a first aspect, the embodiments of the present application provides a charging and heating apparatus, including: at least one power unit each of which being configured to be connected to a battery to be charged/discharged and perform voltage conversion on a received voltage and current and output a converted voltage to the battery; a unidirectional/bidirectional conversion unit connected to each power unit and configured to output a first bidirectional alternating current or a preset current to the at least one power unit; and a control unit connected to the unidirectional/bidirectional conversion unit and configured to: when the battery is in a heating mode, control the unidirectional/bidirectional conversion unit to output the first bidirectional alternating current to the corresponding power unit, such that the battery self-heats under excitation of the first bidirectional alternating current; and when the battery is in a charge/discharge mode, control the unidirectional/bidirectional conversion unit to output the preset current to the power unit, such that the battery is charged/discharged.

In the embodiments of the present application, the first bidirectional alternating current is output to the battery when there is a need for heating, such that the battery self-heats under excitation of the first bidirectional alternating current. This may improve the heating efficiency, and thereby improving the charging efficiency, without a need to provide additional heating devices, which may reduce the cost.

In some embodiments, in the charging and heating apparatus according to the embodiments of the present application, the control unit is further configured to be communicatively connected to a battery management system of the battery, to respond to a request of the battery management system for the heating mode or the charge/discharge mode, and where the battery management system sets a mode of the battery as the heating mode or the charge/discharge mode based on a real-time temperature and/or an SOX parameter of the battery.

In the embodiments of the present application, an operating mode of the battery is controlled by using the battery management system by setting the operating mode of the battery based on the real-time temperature and/or the SOX parameter. This may improve accuracy of the control of the operating mode, thereby improving the charging efficiency.

In some embodiments, in the charging and heating apparatus according to the embodiments of the present application, the control unit is configured to: under a condition that the real-time temperature of the battery is lower than a first preset value and the SOX parameter of the battery meets a first preset condition, control the battery to enter the heating mode.

In the embodiments of the present application, when the real-time temperature and the SOX parameter of the battery meet the condition, the battery is controlled to enter the heating mode. Therefore, the battery may be heated at a good moment, thereby improving the charging efficiency.

In some embodiments, in the charging and heating apparatus according to the embodiments of the present application, the control unit is configured to: under a condition that the real-time temperature of the battery is greater than or equal to a first preset value and the SOX parameter of the battery meets a second preset condition, control the battery to enter the charge/discharge mode.

In the embodiments of the present application, when the real-time temperature and the SOX parameter of the meet the condition, the battery is controlled to enter the heating mode. Therefore, the battery may be charged at a good moment, thereby improving the charging efficiency.

In some embodiments, in the charging and heating apparatus according to the embodiments of the present application, in one period of the first bidirectional alternating current, a duration during which a current direction of the first bidirectional alternating current is from the unidirectional/bidirectional conversion unit to the power unit equals a duration during which the current direction is from the power unit to the unidirectional/bidirectional conversion unit; or in one period of the first bidirectional alternating current, the duration during which the current direction of the first bidirectional alternating current is from the unidirectional/bidirectional conversion unit to the power unit is greater than the duration during which the current direction of the first bidirectional alternating current is from the power unit to the unidirectional/bidirectional conversion unit; or in one period of the first bidirectional alternating current, the duration during which the current direction of the first bidirectional alternating current is from the unidirectional/bidirectional conversion unit to the power unit is less than the duration during which the current direction of the first bidirectional alternating current is from the power unit to the unidirectional/bidirectional conversion unit.

In the embodiments of the present application, the battery may be heated while being charged, or only heated without being charged, that is, the operating mode is changeable, and the adaptability is stronger.

In some embodiments, in the charging and heating apparatus according to the embodiments of the present application, the preset current includes a plurality of segments of second bidirectional alternating currents and a plurality of segments of unidirectional direct currents, and the plurality of segments of second bidirectional alternating currents and the plurality of segments of unidirectional direct currents are distributed at intervals and alternately.

In the embodiments of the present application, the preset current is set in a manner that alternating currents and direct currents are distributed alternately, to enable the battery to be charged in an interval between charging periods, so that the battery may remain in a better temperature range, thereby improving the charging efficiency.

In some embodiments, in the charging and heating apparatus according to the embodiments of the present application, the control unit is further configured to receive a state parameter, collected by a battery management system, of a battery in the charge/discharge mode whose charge/discharge rate reaches a preset threshold, and upload the state parameter and identification information of the battery to a cloud.

In some embodiments, in the charging and heating apparatus according to the embodiments of the present application, the control unit is further configured to upload the SOX parameter, a real-time voltage, and the real-time temperature of the battery to a cloud, such that the cloud determines, based on the SOX parameter, the real-time voltage, the real-time temperature, and historical charge/discharge record information, whether the battery meets a heating condition, and under a condition that the battery meets the heating condition, control the unidirectional/bidirectional conversion unit to output the first bidirectional alternating current to the power unit.

In the embodiments of the present application, the cloud determines, based on the SOX parameter, the real-time voltage, the real-time temperature, and the historical charge/discharge record information, whether the battery meets the heating condition. This may improve control precision, thereby improving the charging efficiency.

In some embodiments, in the charging and heating apparatus according to the embodiments of the present application, the control unit is further configured to upload the SOX parameter, a real-time voltage, and the real-time temperature of the battery to a cloud, such that the cloud determines, based on the SOX parameter, the real-time voltage, the real-time temperature, and historical charge/discharge record information, whether the battery meets a charge/discharge condition, and under a condition that the battery meets the charge/discharge condition, control the unidirectional/bidirectional conversion unit to output the preset current to the power unit.

In some embodiments, in the charging and heating apparatus according to the embodiments of the present application, the charging and heating apparatus further includes at least one first switch unit and at least one second switch unit; the at least one first switch unit is connected to the at least one power unit in a one-to-one correspondence, and the control unit is connected to each first switch unit, so that the first switch unit is switched on or off under control of the corresponding battery management system; each power unit is connected to the unidirectional/bidirectional conversion unit via one corresponding second switch unit; and the control unit is connected to each second switch unit, to connect or disconnect the unidirectional/bidirectional conversion unit to or from the corresponding power unit.

In some embodiments, in the charging and heating apparatus according to the embodiments of the present application, a display panel connected to the control unit and configured to display the real-time temperature and a state parameter of the battery is further included.

According to a second aspect, the embodiments of the present application further provides a method for controlling a charging and heating apparatus, including the following steps: obtaining a state parameter of a battery read by a battery management system; outputting a first bidirectional alternating current to the battery under a condition that the state parameter is within a first preset range, such that the battery self-heats under driving of the first bidirectional alternating current; and outputting a preset current to the battery under a condition that the state parameter is within a second preset range, such that the battery is charged.

In some embodiments, in the method for controlling a charging and heating apparatus according to the embodiments of the present application, the state parameter includes a real-time temperature and/or an SOX parameter of the battery.

In some embodiments, in the method for controlling a charging and heating apparatus according to the embodiments of the present application, the outputting a first bidirectional alternating current to the battery under a condition that the state parameter is within a first preset range includes: outputting a first bidirectional alternating current to the battery under a condition that the real-time temperature of the battery is lower than a first preset value and the SOX parameter of the battery meets a first preset condition.

In some embodiments, in the method for controlling a charging and heating apparatus according to the embodiments of the present application, the outputting a preset current to the battery under a condition that the state parameter is within a second preset range, such that the battery is charged includes: outputting a preset current to the battery under a condition that the real-time temperature of the battery is greater than or equal to the first preset value and the SOX parameter of the battery meets a second preset condition, such that the battery is charged.

In some embodiments, in the method for controlling a charging and heating apparatus according to the embodiments of the present application, the preset current is a unidirectional direct current; or the preset current includes a plurality of segments of second bidirectional alternating currents and a plurality of segments of unidirectional direct currents, and the plurality of segments of second bidirectional alternating currents and the plurality of segments of unidirectional direct currents are distributed at intervals and alternately.

In some embodiments, in the method for controlling a charging and heating apparatus according to the embodiments of the present application, the outputting a first bidirectional alternating current to the battery under a condition that the state parameter is within a first preset range includes: uploading the SOX parameter, a real-time voltage, and the real-time temperature of the battery to a cloud, such that the cloud determines, based on the SOX parameter, the real-time temperature, and historical charge record information, whether the battery meets a heating condition, and under a condition that the battery meets the heating condition, outputting the first bidirectional alternating current to the battery to heat the battery.

In some embodiments, in the method for controlling a charging and heating apparatus according to the embodiments of the present application, the outputting a preset current to the battery under a condition that the state parameter is within a second preset range, such that the battery is charged includes: uploading the SOX parameter, a real-time voltage, and the real-time temperature of the battery to a cloud, such that the cloud determines, based on the SOX parameter, the real-time voltage, the real-time temperature, and historical charge record information, whether the battery meets a charge/discharge condition, and under a condition that the battery meets the charge/discharge condition, outputting the preset current to the battery to charge the battery.

According to a third aspect, the embodiments of the present application further provides an apparatus for controlling a charging and heating apparatus, including: an obtaining module configured to obtain a state parameter of a battery read by a battery management system; a first control module configured to output a first bidirectional alternating current to the battery under a condition that the state parameter is within a first preset range, such that the battery self-heats under driving of the first bidirectional alternating current; and a second control module configured to output a preset current to the battery under a condition that the state parameter is within a second preset range, such that the battery is charged.

According to the charging and heating apparatus and the method and apparatus for controlling a charging and heating apparatus provided in the embodiments of the present application, the unidirectional/bidirectional conversion unit is controlled, in the heating mode, to output the first bidirectional alternating current to the battery, such that the battery self-heats under excitation of the first bidirectional alternating current, and therefore, there is no need for a dedicated heating circuit to heat the battery, energy density of the battery may be increased, and cost may be reduced. Due to the self-heating of battery cells inside the battery under the excitation of the alternating current, there is no need for an external heating structure for heating and heat conduction. Therefore, the heating efficiency may be improved, and thus, charging time of the battery may be reduced.

BRIEF DESCRIPTION OF THE DRAWINGS

Various other advantages and benefits will become apparent to those of ordinary skill in the art upon reading the following detailed description of some embodiments. The drawings are merely for the purpose of illustrating the embodiments and are not to be construed as limiting the present application. Moreover, like components are denoted by like reference numerals throughout the drawings. In the drawings.

DETAILED DESCRIPTION OF EMBODIMENTS

Figure 1:
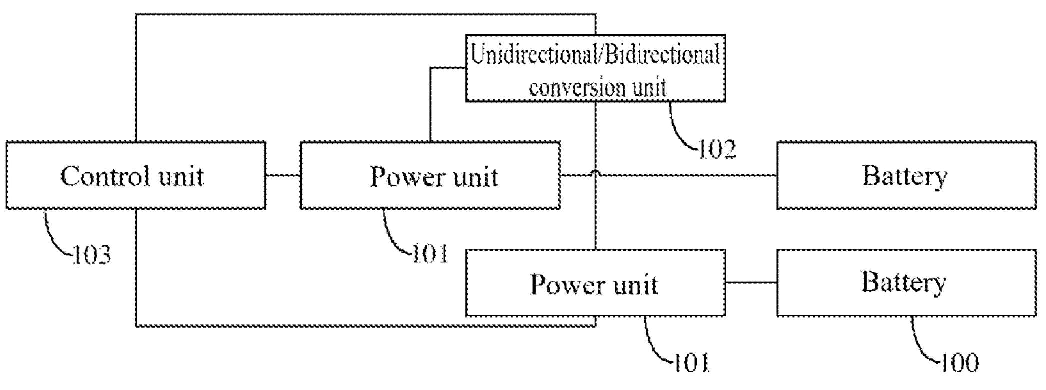
FIG. 1 is a first schematic structural diagram of a charging and heating apparatus according to some embodiments of the present application.

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technological and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures and characteristics described in conjunction with the embodiment may be included in at least one of the embodiments of the present application. The phrase at various locations in the specification does not necessarily refer to the same embodiment, or an independent or alternative embodiment exclusive of another embodiment. Those skilled in the art understand explicitly or implicitly that an embodiment described herein may be combined with another embodiment.

In the description of the embodiments of the present application, the term "and/or" is merely intended to describe the associated relationship of associated objects, representing that three relationships can exist, for example, A and/or B can include: the three instances of A alone, A and B simultaneously, and B alone. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the drawings and are merely intended to facilitate and simplify the description of the embodiments of the present application, rather than indicating or implying that the device or element considered must have a particular orientation or be constructed and operated in a particular orientation, and therefore not to be construed as limiting the embodiments of the present application.

In the description of the embodiments of this application, unless otherwise explicitly specified and defined, the technical terms "mounting", "mutual connection", "connection" and "fixing" should be understood in a broad sense, for example, they may be a fixed connection, a detachable connection, or an integrated connection; may be a mechanical connection or an electrical connection; and may be a direct connection or an indirect connection through an intermediate medium, and may be communication between interiors of two elements or interaction between the two elements. For those of ordinary skill in the art, the specific meaning of the above terms in the embodiments of the present application can be understood according to specific situations.

Referring to FIG. 1, FIG. 1 is a schematic structural diagram of a charging and heating apparatus according to some embodiments of the present application. The charging and heating apparatus includes: at least one power unit 101, a unidirectional/bidirectional conversion unit 102, and a control unit 103.

Each power unit 101 is configured to be connected to a battery 100 to be charged/discharged and perform voltage conversion on a voltage and current received by the power unit 101 and output a converted voltage to the battery 100. The unidirectional/bidirectional conversion unit 102 is connected to each power unit 101 and configured to output a first bidirectional alternating current or a preset current to the at least one power unit 101. The control unit 103 is connected to each power unit 101 and the unidirectional/bidirectional conversion unit 102 and configured to: when the battery 100 is in a heating mode, control the unidirectional/bidirectional conversion unit 102 to output the first bidirectional alternating current to the power unit 101, such that the battery 100 self-heats under excitation of the first bidirectional alternating current; and when the battery 100 is in a charge/discharge mode, control the unidirectional/bidirectional conversion unit to output the preset current to the power unit 101, such that the battery 100 is charged/discharged.

The first bidirectional alternating current is positive and negative alternating currents crossing zero.

In some embodiments, the first bidirectional alternating current may be a periodic signal or a non-periodic signal; or the first bidirectional alternating current may be a periodic signal in part and a non-periodic signal in part.

In some embodiments, the first bidirectional alternating current is a periodic signal. In one period of the first bidirectional alternating current, a duration during which the current direction of the first bidirectional alternating current is from the unidirectional/bidirectional conversion unit 102 to the power unit 101 equals a duration during which the current direction of the first bidirectional alternating current is from the power unit 101 to the unidirectional/bidirectional conversion unit 102. In this scenario, the unidirectional/bidirectional conversion unit 102 drives the battery 100 to self-heat. The battery is only heated and a total amount of electric charges does not change.

Alternatively, in one period of the first bidirectional alternating current, the duration during which the current direction of the first bidirectional alternating current is from the unidirectional/bidirectional conversion unit 102 to the power unit 101 is less than the duration during which the current direction of the first bidirectional alternating current is from the power unit 101 to the unidirectional/bidirectional conversion unit 102, so that the battery 100 is in a discharging state, and an amount of electric charges of the battery 100 is reduced.

Alternatively, in one period of the first bidirectional alternating current, the duration during which the current direction of the first bidirectional alternating current is from the unidirectional/bidirectional conversion unit 102 to the power unit 101 is greater than the duration during which the current direction of the first bidirectional alternating current is from the power unit 101 to the unidirectional/bidirectional conversion unit 102. In this case, the battery is charged while self-heating, which improves the charging efficiency.

Figure 2:
FIG. 2 shows some waveform graphs of a first bidirectional alternating current of a charging and heating apparatus according to some embodiments of the present application.

As shown in FIG. 2, the first bidirectional alternating current may be a square wave signal, a sine wave signal, a sawtooth wave signal, or a ramp signal.

Figure 3:
FIG. 3 shows some other waveform graphs of a first bidirectional alternating current of a charging and heating apparatus according to some embodiments of the present application.

Certainly, as shown in FIG. 3, the first bidirectional alternating current may alternatively be a derived signal from a square wave signal, a sine wave signal, a sawtooth wave signal, or a ramp signal. For example, a level signal with a constant voltage may be added between the first half period and the second half period of a square wave signal or a sine wave signal.

The preset current may be a unidirectional direct current, that is, in the charge mode, the battery is only charged without self-heating. Certainly, the preset current may alternatively be a bidirectional alternating current, that is, the battery self-heats while being charged. Alternatively, the preset current may include a plurality of segments of second bidirectional alternating currents and a plurality of segments of unidirectional direct currents, and the plurality of segments of second bidirectional alternating currents and the plurality of segments of unidirectional direct currents are distributed at intervals and alternately. Therefore, the battery may be first charged for a period of time and then heated for a period of time, thereby maintaining a temperature of the battery in a low-temperature environment by charging and heating the battery alternately without any complex operations.

In the embodiments of the present application, the unidirectional/bidirectional conversion unit is controlled, in the heating mode, to output the first bidirectional alternating current to the battery, such that the battery self-heats under excitation of the first bidirectional alternating current, and therefore, there is no need for a dedicated heating circuit to heat the battery, energy density of the battery may be increased, and cost may be reduced. Due to the self-heating of battery cells inside the battery under the excitation of the alternating current, there is no need for an external heating structure for heating and heat conduction. Therefore, the heating efficiency may be improved, and thus, charging time of the battery may be reduced.

Specifically, the power unit 101 is a high-voltage inverter component for rectification, filtering, and inversion using a power electronic device, and the high-voltage inverter component also has boost and buck functions. The control unit 103 first controls the power unit 101 to output a constant current to a corresponding battery 100 to charge the battery to a threshold of state of charge (SOC), that is, a preset value of state of charge, and then control the power unit to fully charge the battery at a preset constant voltage. Certainly, the charging strategy is not limited to this.

The unidirectional/bidirectional conversion unit 102 is configured to output an alternating current or a direct current having a corresponding specification. The unidirectional/bidirectional conversion unit may adjust a magnitude of the output current. The control unit 103 may be a chip or a microprocessor.

Figures 4, 5, 6:
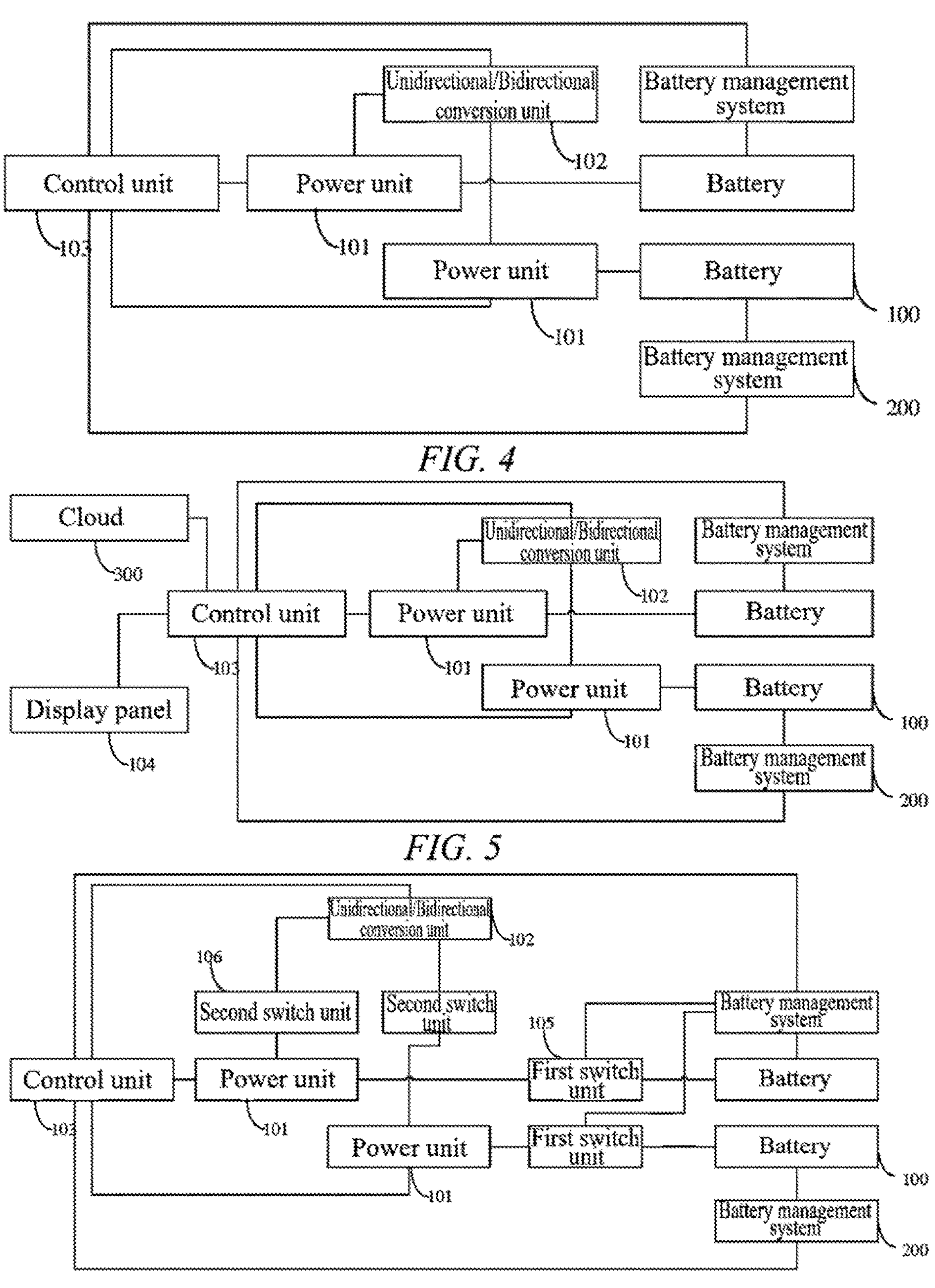
FIG. 4 is a second schematic structural diagram of a charging and heating apparatus according to some embodiments of the present application.
FIG. 5 is a third schematic structural diagram of a charging and heating apparatus according to some embodiments of the present application.
FIG. 6 is a fourth schematic structural diagram of a charging and heating apparatus according to some embodiments of the present application.

As shown in FIG. 4, in some embodiments, the control unit 103 is further configured to be communicatively connected to a battery management system 200 of the battery, to respond to a request of the battery management system 200 for the heating mode or the charge/discharge mode, where the battery management system 200 sets a mode of the battery 100 as the heating mode or the charge/discharge mode based on a real-time temperature and/or a state of X (SOX) parameter of the battery 100. The battery management system 200 may control an operating mode of the battery 100 based on the real-time temperature of the battery 100; or the battery management system 200 may control the operating mode of the battery 100 based on the SOX parameter; or the battery management system 200 may control the operating mode of the battery 100 based on the real-time temperature and the SOX parameter. The SOX parameter may include an SOC parameter, a state of health (SOH) parameter and a state of power (SOP) parameter. The battery management system 200 may be a charge and discharge management circuit. The SOX parameter is a state of charge parameter of the battery. The SOH parameter is a service life state parameter of the battery 100. The SOP parameter is a power state parameter of the battery 100.

For example, the battery management system 200 is configured to: under a condition that the real-time temperature of the battery 100 is lower than a first preset value and the SOX parameter of the battery meets a first preset condition, request the control unit to control the battery 100 to enter the heating mode; and under a condition that the real-time temperature of the battery 100 is greater than or equal to the first preset value and the SOX parameter of the battery 100 meets a second preset condition, request the control unit to control the battery 100 to enter the charge/discharge mode. For example, the first preset value may be set to be 18 degrees Celsius, and the first preset condition may be that the SOC parameter is greater than or equal to 15%. Certainly, the first preset condition and the first preset value may be set depending on specific situations.

It may be understood that, in some embodiments, the control unit 103 is further configured to obtain an environment temperature, and then select the heating mode based on the environment temperature. Under a condition that the environment temperature is within a first preset temperature range, heating and charging are performed alternately. Under a condition that the environment temperature is within a second preset temperature range, real-time dynamic control is performed based on the real-time temperature and the SOX parameter of the battery. The first preset temperature range is greater than the second preset temperature range. In other words, in an extremely low-temperature environment, the battery temperature needs to be controlled dynamically and in real time; however, under a condition that the environment temperature is not very low, heating and charging may be performed alternately, to maintain the battery temperature at a good value. Specifically, the control unit 103 is configured to obtain the environment temperature which may be collected by using an environment temperature sensor, and select the heating mode based on the environment temperature. Under the condition that the environment temperature is within the first preset temperature range, heating and charging of the battery are performed alternately, where a ratio of heating time to charging time is set based on the environment temperature, so that the lower the environment temperature, the greater the ratio of the heating time to the charging time. Under the condition that the environment temperature is within the second preset temperature range, whether the battery is in a heating state or a charging state is controlled based on the real-time temperature and/or the SOX parameter of the battery.

As shown in FIG. 5, in some embodiments, the control unit 103 is further configured to receive a state parameter, collected by the battery management system 200, of a battery 100 in the charge/discharge mode whose charge/discharge rate reaches a preset threshold, and upload the state parameter and identification information of the battery to a cloud 300. For example, the preset threshold refers to that the charge rate of the battery 100 reaches full charge, or the discharge rate reaches 10% or lower, helping the cloud to store the state parameter of the battery whose charge/discharge rate reaches the preset threshold and use the state parameter as an important parameter for subsequent calculation of the heating or charging state of the battery.

The control unit 103 is further configured to upload the SOX parameter, a real-time voltage, and the real-time temperature of the battery to a cloud, such that the cloud determines, based on the SOX parameter, the real-time voltage, the real-time temperature, and historical charge/discharge record information, whether the battery meets a heating condition, and under a condition that the battery meets the heating condition, control the unidirectional/bidirectional conversion unit to output the first bidirectional alternating current to the power unit. The historical charge/discharge record information is the state parameter, uploaded to the cloud as described above, of the battery whose charge/discharge rate reaches the preset threshold. The control unit 103 is further configured to upload the SOX parameter, a real-time voltage, and the real-time temperature of the battery to a cloud, such that the cloud determines, based on the SOX parameter, the real-time voltage, the real-time temperature, and historical charge/discharge record information, whether the battery meets a charge/discharge condition, and under a condition that the battery meets the charge/discharge condition, control the unidirectional/bidirectional conversion unit 102 to output the preset current to the power unit. The historical charge/discharge record information is the state parameter, uploaded to the cloud as described above, of the battery whose charge/discharge rate reaches the preset threshold. The state parameter includes the real-time voltage, the SOX parameter, and the real-time temperature of the battery, etc. In the embodiments of the present application, the determination is made in the cloud based on the heating condition and the charge/discharge condition in conjunction with the historical charge/discharge record information stored in the cloud, where the determination is also made based on the historical charge/discharge record information. This may improve accuracy of the determination and the charging efficiency.

The charging and heating apparatus further includes a display panel 104 connected to the control unit 103 and configured to display the real-time temperature and the state parameter of the battery, where the state parameter may include a charging current, a charging voltage, a power level, etc.

As shown in FIG. 6, in some embodiments, the charging and heating apparatus further includes at least one first switch unit 105 and at least one second switch unit 106. The number of first switch units 105 is the same as that of power units 101. The at least one first switch unit 105 is connected to the at least one power unit 101 in a one-to-one correspondence, and a control terminal of each first switch unit 105 is connected to the battery management system 200, so that the first switch unit is switched on or off under control of the battery management system 200, thereby controlling whether to output a current to the battery 100. Certainly, the control terminal of the first switch unit 105 may also be connected to the control unit 103. Each power unit 101 is connected to the unidirectional/bidirectional conversion unit 102 via a second switch unit 106; and the control unit 103 is connected to each second switch unit 106, to connect or disconnect the unidirectional/bidirectional conversion unit 102 to or from the corresponding power unit 101. The first switch unit 105 may be an electromagnetic relay or another switch device. The second switch unit 106 may be an electromagnetic relay or another switch device.

Figure 7:
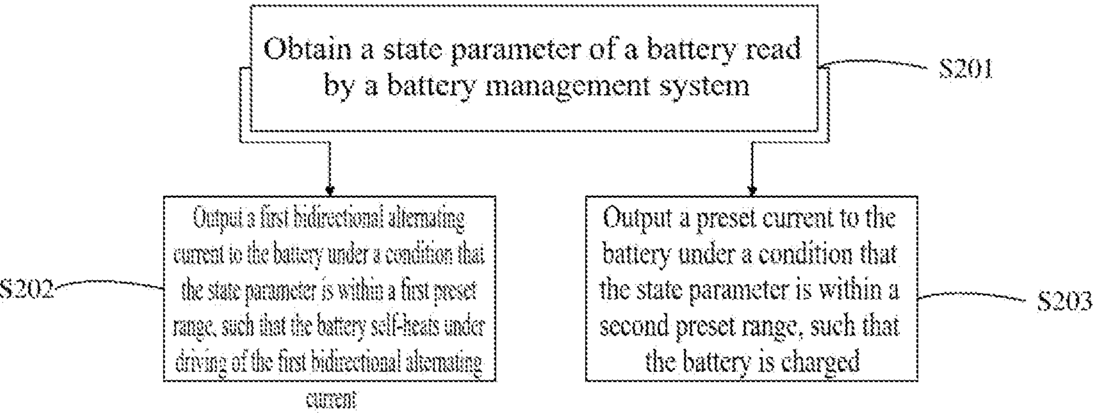
FIG. 7 is a flowchart of a method for controlling a charging and heating apparatus according to some embodiments of the present application.

Referring to FIG. 7, FIG. 7 is a flowchart of a method for controlling a charging and heating apparatus according to some embodiments of the present application. The method for controlling a charging and heating apparatus includes the following steps:

- step S201: obtaining a state parameter of a battery read by a battery management system;
- step S202: outputting a first bidirectional alternating current to the battery under a condition that the state parameter is within a first preset range, such that the battery self-heats under driving of the first bidirectional alternating current; and
- step S203: outputting a preset current to the battery under a condition that the state parameter is within a second preset range, such that the battery is charged.

In step S201, the battery management system may be a separate system, or may be integrated with the charging and heating apparatus. The state parameter of the battery includes a real-time temperature and/or an SOX parameter of the battery. The state parameter may include the real-time temperature alone, or the SOX parameter alone, or both. The SOX parameter is specifically explained in the embodiments described above, and details are not described herein again.

In step S202, under a condition that the state parameter includes the real-time temperature and the SOX parameter, the step S202 is specifically: outputting a first bidirectional alternating current to the battery under a condition that the real-time temperature of the battery is lower than a first preset value and the SOX parameter of the battery meets a first preset condition, such that the battery self-heats under excitation of the first bidirectional alternating current. The first preset value may be set based on performance of the battery. For example, the first preset value may be set to be 18 degrees Celsius. Certainly, the first preset value is not limited to this value. The first preset condition is that the SOX parameter is greater than or equal to 15% (or another value). Certainly, the first preset condition may be set depending on specific situations of the battery.

Certainly, under a condition that the state parameter of the battery includes the real-time temperature of the battery, the state parameter being within the first preset range means that the real-time temperature of the battery is greater than the first preset value.

Certainly, under a condition that the state parameter of the battery includes the SOX parameter of the battery, the state parameter being within the first preset range means that the SOX parameter meets the first preset condition.

In step S203, under the condition that the state parameter includes the real-time temperature and the SOX parameter, the step S203 is specifically: outputting a preset current to the battery under a condition that the real-time temperature of the battery is greater than or equal to the first preset value and the SOX parameter of the battery meets a second preset condition, such that the battery is charged. The second preset condition is that the SOX parameter is greater than or equal to 15% (or another value). The second preset condition may be set depending on specific situations of the battery.

Certainly, under the condition that the state parameter of the battery includes the real-time temperature of the battery, the state parameter being within the second preset range means that the real-time temperature of the battery is less than the first preset value.

Certainly, under the condition that the state parameter of the battery includes the SOX parameter of the battery, the state parameter being within the second preset range means that the SOX parameter meets the second preset condition.

In some embodiments, the first bidirectional alternating current is a square wave signal, a sine wave signal, a sawtooth wave signal, or a ramp signal. The preset current is a unidirectional direct current.

In some embodiments, the preset current includes a plurality of segments of second bidirectional alternating currents and a plurality of segments of unidirectional direct currents, and the plurality of segments of second bidirectional alternating currents and the plurality of segments of unidirectional direct currents are distributed at intervals and alternately.

In some embodiments, step S202 may include the following steps: uploading the SOX parameter, a real-time voltage, and the real-time temperature of the battery to a cloud, such that the cloud determines, based on the SOX parameter, the real-time temperature, the real-time voltage, and historical charge record information, whether the battery meets a heating condition, and under a condition that the battery meets the heating condition, outputting the first bidirectional alternating current to the battery to heat the battery.

In some embodiments, step S203 may include the following steps: uploading the SOX parameter, a real-time voltage, and the real-time temperature of the battery to a cloud, such that the cloud determines, based on the SOX parameter, the real-time voltage, the real-time temperature, and historical charge record information, whether the battery meets a charge/discharge condition, and under a condition that the battery meets the charge/discharge condition, outputting the preset current to the battery to charge the battery. In the embodiments of the present application, the determination is made in the cloud based on the heating condition and the charge/discharge condition in conjunction with the historical charge/discharge record information stored in the cloud, where the determination is also made based on the historical charge/discharge record information. This may improve accuracy of the determination and the charging efficiency.

Figure 8:
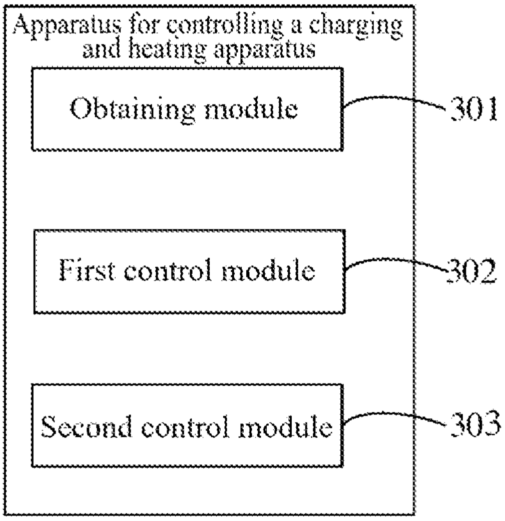
FIG. 8 is a structural diagram of an apparatus for controlling a charging and heating apparatus according to some embodiments of the present application.

Referring to FIG. 8, FIG. 8 is a structural diagram of an apparatus for controlling a charging and heating apparatus according to some embodiments of the present application. The apparatus for controlling a charging and heating apparatus includes: an obtaining module 301, a first control module 302, and a second control module 303.

The obtaining module 301 is configured to obtain a state parameter of a battery read by a battery management system. The battery management system may be a separate system, or may be integrated with the charging and heating apparatus. The state parameter of the battery includes a real-time temperature and/or an SOX parameter of the battery. The state parameter may include the real-time temperature alone, or the SOX parameter alone, or both. The SOX parameter is specifically explained in the embodiments described above, and details are not described herein again.

The first control module 302 is configured to: output a first bidirectional alternating current to the battery under a condition that the state parameter is within a first preset range, such that the battery self-heats under driving of the first bidirectional alternating current. Under a condition that the state parameter includes the real-time temperature and the SOX parameter, the first control module 302 is specifically configured to output a first bidirectional alternating current to the battery under a condition that the real-time temperature of the battery is lower than a first preset value and the SOX parameter of the battery meets a first preset condition, such that the battery self-heats under excitation of the first bidirectional alternating current. The first preset value may be set based on performance of the battery. For example, the first preset value may be set to be 18 degrees Celsius. Certainly, the first preset value is not limited to this value. The first preset condition is that the SOX parameter is greater than or equal to 15% (or another value). Certainly, the first preset condition may be set depending on specific situations of the battery. Certainly, under a condition that the state parameter of the battery includes the real-time temperature of the battery, the state parameter being within the first preset range means that the real-time temperature of the battery is greater than the first preset value. Certainly, under a condition that the state parameter of the battery includes the SOX parameter of the battery, the state parameter being within the first preset range means that the SOX parameter meets the first preset condition.

The second control module 303 is configured to output a preset current to the battery under a condition that the state parameter is within a second preset range, such that the battery is charged. Under the condition that the state parameter includes the real-time temperature and the SOX parameter, the second control module 303 is specifically configured to: output a preset current to the battery under a condition that the real-time temperature of the battery is greater than or equal to the first preset value and the SOX parameter of the battery meets a second preset condition, such that the battery is charged. The second preset condition is that the SOX parameter is greater than or equal to 15% (or another value). The second preset condition may be set depending on specific situations of the battery. Certainly, under the condition that the state parameter of the battery includes the real-time temperature of the battery, the state parameter being within the second preset range means that the real-time temperature of the battery is less than the first preset value. Certainly, under the condition that the state parameter of the battery includes the SOX parameter of the battery, the state parameter being within the second preset range means that the SOX parameter meets the second preset condition. In some embodiments, the first bidirectional alternating current is a square wave signal, a sine wave signal, a sawtooth wave signal, or a ramp signal. The preset current is a unidirectional direct current. In some embodiments, the preset current includes a plurality of segments of second bidirectional alternating currents and a plurality of segments of unidirectional direct currents, and the plurality of segments of second bidirectional alternating currents and the plurality of segments of unidirectional direct currents are distributed at intervals and alternately.

According to the charging and heating apparatus and the method and apparatus for controlling a charging and heating apparatus provided in the embodiments of the present application, the unidirectional/bidirectional conversion unit is controlled, in the heating mode, to output the first bidirectional alternating current to the battery, such that the battery self-heats under excitation of the first bidirectional alternating current, and therefore, there is no need for a dedicated heating circuit to heat the battery, energy density of the battery may be increased, and cost may be reduced. Due to the self-heating of battery cells inside the battery under the excitation of the alternating current, there is no need for an external heating structure for heating and heat conduction. Therefore, the heating efficiency may be improved, and thus, charging time of the battery may be reduced.

Finally, it should be noted that, the above embodiments are merely used for illustrating rather than limiting the technical solution of the present application. Although the present application has been illustrated in detail with reference to the foregoing embodiments, it should be understood by those of ordinary skill in the art that the technical solutions recorded in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, as long as there is no structural conflict. The present application is not limited to the specific embodiments disclosed herein, but includes all technical solutions that fall within the scope of the claims.

The invention claimed is:

1. A charging and heating apparatus, comprising:

a power unit configured to be connected to a battery to be charged/discharged and perform voltage conversion on a received voltage and current and output a converted voltage to the battery;

a unidirectional/bidirectional conversion unit connected to the power unit and configured to output an alternating current or a preset current to the power unit; and a control unit connected to the unidirectional/bidirectional conversion unit and configured to:

in response to the battery being in a heating mode, control the unidirectional/bidirectional conversion unit to output the alternating current to the power unit, such that the battery self-heats under excitation of the alternating current; and in response to the battery being in a charge/discharge mode, control the unidirectional/bidirectional conversion unit to output the preset current to the power unit, such that the battery is charged/discharged;

wherein:

the control unit is configured to be communicatively connected to a battery management system of the battery, to respond to a request from the battery management system for the heating mode or the charge/discharge mode;

the battery management system sets a mode of the battery as the heating mode or the charge/discharge mode based on at least one of a real-time temperature or a state of X (SOX) parameter of the battery; and the control unit is configured to upload the SOX parameter, a real-time voltage, and the real-time temperature of the battery to a cloud, such that the cloud determines, based on the SOX parameter, the real-time voltage, the real-time temperature, and historical charge/discharge record information, whether the battery meets a charge/discharge condition, and, in response to the battery meeting the charge/discharge condition, control the unidirectional/bidirectional conversion unit to output the preset current to the power unit.

2. The charging and heating apparatus according to claim 1, wherein the control unit is configured to, in response to the real-time temperature of the battery being lower than a preset value and the SOX parameter of the battery meeting a preset condition, control the battery to enter the heating mode.

3. The charging and heating apparatus according to claim 1, wherein the control unit is configured to, in response to the real-time temperature of the battery being greater than or equal to a preset value and the SOX parameter of the battery meeting a preset condition, control the battery to enter the charge/discharge mode.

4. The charging and heating apparatus according to claim 1, wherein the control unit is further configured to:

receive a state parameter, collected by the battery management system, of the battery in the charge/discharge mode, the state parameter indicating that a charge/discharge rate of the battery reaches a preset threshold; and upload the state parameter and identification information of the battery to a cloud.

5. The charging and heating apparatus according to claim 1, further comprising:

a display panel connected to the control unit and configured to display the real-time temperature and a state parameter of the battery.

6. The charging and heating apparatus according to claim 1, wherein in one period of the alternating current, a duration during which a current direction of the alternating current is from the unidirectional/bidirectional conversion unit to the power unit is greater than or equal to a duration during which the current direction is from the power unit to the unidirectional/bidirectional conversion unit.

7. The charging and heating apparatus according to claim 1, wherein in one period of the alternating current, a duration during which a current direction of the alternating current is from the unidirectional/bidirectional conversion unit to the power unit is greater than or less than a duration during which the current direction is from the power unit to the unidirectional/bidirectional conversion unit.

8. The charging and heating apparatus according to claim 1, wherein:

the alternating current is a first alternating current; and the preset current comprises a plurality of segments of second alternating currents and a plurality of segments of unidirectional direct currents, and the plurality of segments of second alternating currents and the plurality of segments of unidirectional direct currents are distributed alternately at intervals.

9. The charging and heating apparatus according to claim 1, further comprising:

a first switch unit connected to the power unit and the control unit, the first switch unit being configured to be switched on or off under control of a battery management system; and a second switch unit connecting the power unit to the unidirectional/bidirectional conversion unit;

wherein the control unit is connected to the second switch unit, to connect or disconnect the unidirectional/bidirectional conversion unit to or from the power unit.

10. A method for controlling a charging and heating apparatus, comprising:

obtaining a state parameter of a battery read by a battery management system, wherein the state parameter comprises at least one of a real-time temperature or a state of X (SOX) parameter of the battery;

outputting an alternating current to the battery in response to the state parameter being within a first preset range, such that the battery self-heats under driving of the alternating current; and outputting a preset current to the battery in response to the state parameter being within a second preset range, such that the battery is charged, comprising:

uploading the SOX parameter, a real-time voltage, and the real-time temperature of the battery to a cloud, such that the cloud determines, based on the SOX parameter, the real-time voltage, the real-time temperature, and historical charge record information, whether the battery meets a charge/discharge condition; and in response to the battery meeting the charge/discharge condition, outputting the preset current to the battery to charge the battery.

11. The method for controlling the charging and heating apparatus according to claim 10, wherein outputting the alternating current to the battery in response to the state parameter being within the first preset range comprises:

outputting the alternating current to the battery in response to the real-time temperature of the battery being lower than a preset value and the SOX parameter of the battery meeting a preset condition.

12. The method for controlling the charging and heating apparatus according to claim 10, wherein outputting the preset current to the battery in response to the state parameter being within the second preset range comprises:

outputting the preset current to the battery in response to the real-time temperature of the battery being greater than or equal to a preset value and the SOX parameter of the battery meeting a preset condition.

13. The method for controlling the charging and heating apparatus according to claim 10, wherein:

the alternating current is a first alternating current; and the preset current comprises:

a unidirectional direct current; or a plurality of segments of second alternating currents and a plurality of segments of unidirectional direct currents, the plurality of segments of second alternating currents and the plurality of segments of unidirectional direct currents being distributed alternately at intervals.

14. A charging and heating apparatus, comprising:

a power unit configured to be connected to a battery to be charged/discharged and perform voltage conversion on a received voltage and current and output a converted voltage to the battery;

a unidirectional/bidirectional conversion unit connected to the power unit and configured to output a first alternating current or a preset current to the power unit; and a control unit connected to the unidirectional/bidirectional conversion unit and configured to:

in response to the battery being in a heating mode, control the unidirectional/bidirectional conversion unit to output the alternating current to the power unit, such that the battery self-heats under excitation of the alternating current; and in response to the battery being in a charge/discharge mode, control the unidirectional/bidirectional conversion unit to output the preset current to the power unit, such that the battery is charged/discharged;

wherein:

the control unit is configured to be communicatively connected to a battery management system of the battery, to respond to a request from the battery management system for the heating mode or the charge/discharge mode;

the battery management system sets a mode of the battery as the heating mode or the charge/discharge mode based on at least one of a real-time temperature or a state of X (SOX) parameter of the battery; and the control unit is configured to, in response to the real-time temperature of the battery being greater than or equal to a preset value and the SOX parameter of the battery meeting a preset condition, control the battery to enter the charge/discharge mode.

* * * * *